US 12,251,665 B2

(12) United States Patent
Kim et al.

(10) Patent No.: US 12,251,665 B2
(45) Date of Patent: Mar. 18, 2025

(54) MODULAR MANIFOLD FOR FILTRATION MODULES

(71) Applicant: Hydranautics, Oceanside, CA (US)

(72) Inventors: Won Kim, San Diego, CA (US); David Shin, Oceanside, CA (US)

(73) Assignee: HYDRANAUTICS, Oceanside, CA (US)

(*) Notice: Subject to any disclaimer, the term of this patent is extended or adjusted under 35 U.S.C. 154(b) by 437 days.

(21) Appl. No.: 17/765,240

(22) PCT Filed: Sep. 1, 2020

(86) PCT No.: PCT/US2020/048868
§ 371 (c)(1),
(2) Date: Mar. 30, 2022

(87) PCT Pub. No.: WO2021/101614
PCT Pub. Date: May 27, 2021

(65) Prior Publication Data
US 2022/0288537 A1    Sep. 15, 2022

Related U.S. Application Data

(60) Provisional application No. 62/938,575, filed on Nov. 21, 2019.

(51) Int. Cl.
*B01D 61/18* (2006.01)
*B01D 63/04* (2006.01)
*B01D 65/02* (2006.01)

(52) U.S. Cl.
CPC ............ *B01D 65/02* (2013.01); *B01D 61/18* (2013.01); *B01D 63/046* (2013.01);
(Continued)

(58) Field of Classification Search
CPC ...... B01D 65/02; B01D 61/18; B01D 63/046; B01D 2313/105; B01D 2313/20;
(Continued)

(56) References Cited

U.S. PATENT DOCUMENTS 4,016,078 A    4/1977  Clark
4,876,012 A    10/1989 Kopp et al.
(Continued)

FOREIGN PATENT DOCUMENTS

AU    2015200940 A1 *  9/2015  ............. B01D 29/52
CN    205412690 U     8/2016
(Continued)

OTHER PUBLICATIONS

International Search Report and Written Opinion issued Dec. 3, 2020 in International Application No. PCT/US2020/048868.
(Continued)

*Primary Examiner* — Joseph W Drodge
(74) *Attorney, Agent, or Firm* — Panitch Schwarze Belisario & Nadel LLP (57) ABSTRACT

A modular header for a filtration module assembly is provided. The modular header includes a main body, a first liquid passageway and a second liquid passageway extending through the main body, and a gas passageway extending through the main body. The gas passageway has a first open end formed at a first side surface of the main body and an opposing second open end formed at a second side surface of the main body. An auxiliary adapter is secured to the main body at at least one of the first and second open ends of the gas passageway.

16 Claims, 12 Drawing Sheets

(52) U.S. Cl.
CPC .... *B01D 2313/105* (2013.01); *B01D 2313/20* (2013.01); *B01D 2313/21* (2013.01); *B01D 2313/54* (2013.01); *B01D 2317/04* (2013.01); *B01D 2321/18* (2013.01)

(58) Field of Classification Search
CPC ............ B01D 2313/21; B01D 2313/54; B01D 2317/04; B01D 2321/18; B01D 2313/125; B01D 2317/02; B01D 2317/06; B01D 65/00; B01D 63/04; B01D 63/069; B01D 2313/10; B01D 2313/12; B01D 2313/13; B01D 2319/04
See application file for complete search history.

(56) References Cited

U.S. PATENT DOCUMENTS

| | | | |
|---|---|---|---|
| 7,862,719 B2 | 1/2011 | McMahon et al. | |
| 7,909,997 B2 | 3/2011 | Stoick | |
| 9,604,166 B2 | 3/2017 | Biltoft et al. | |
| 9,925,499 B2 | 3/2018 | Collignon et al. | |
| 2004/0188339 A1* | 9/2004 | Murkute | B01D 61/18 210/321.79 |
| 2007/0102339 A1* | 5/2007 | Cote | B01D 61/18 210/636 |
| 2014/0231367 A1* | 8/2014 | Biltoft | B01D 35/34 210/454 |
| 2014/0238922 A1 | 8/2014 | Puglia et al. | |

FOREIGN PATENT DOCUMENTS

| | | | | |
|---|---|---|---|---|
| EP | 2670517 A1 | | 12/2013 | |
| EP | 3473329 A1 | * | 4/2019 | ........... B01D 63/046 |
| WO | 2012105835 A1 | | 8/2012 | |

OTHER PUBLICATIONS

Office Action issued Dec. 26, 2023 in CN Application No. 2020800809185.

* cited by examiner

RETENTATE

FILTRATE

MODULAR MANIFOLD FOR FILTRATION MODULES

CROSS-REFERENCE TO RELATED APPLICATION

This application is a Section 371 of International Application No. PCT/US20/48868, filed Sep. 1, 2020, which was published on May 27, 2021, under International Publication No. WO 2021/101614, which claims priority to U.S. Provisional Patent Application No. 62/938,575, filed Nov. 21, 2019, the disclosures of each of which are incorporated herein by reference in their entireties.

BACKGROUND OF THE INVENTION

The present invention is directed generally to modular manifold for filtration modules which enables gas scouring of filtration membranes within the filtration modules.

Filtration modules are typically used to filter or otherwise treat various types of liquid, for example to separate impurities from the liquid. Over time, the impurities will accumulate on surfaces the filtration membranes, thereby leading to fouling of the filtration membranes. Therefore, after a period of filtering impurities from the liquid, a physical cleaning of the filtration membranes is typically performed, for example, by backwashing (i.e., pumping liquid through the filtration membranes in a direction reverse to the filtration path) or gas scouring (i.e., bubbling air along the filtration membranes to vibrate the membranes and shake impurities loose).

Since gas scouring is an important cleaning mechanism, it would be desirable to provide a configuration which enables optimized, quick and simple gas scouring. The present invention provides a modular header design which includes fluidically separate and distinct gas and liquid passageways for optimization of liquid distribution and efficient gas scouring.

BRIEF SUMMARY OF THE INVENTION

One embodiment of the invention relates to a modular header for a filtration module assembly. The modular header includes a main body, a first liquid passageway and a second liquid passageway extending through the main body, and a gas passageway extending through the main body. The gas passageway has a first open end formed at a first side surface of the main body and an opposing second open end formed at a second side surface of the main body. An auxiliary adapter is secured to the main body at at least one of the first and second open ends of the gas passageway.

Another embodiment of the invention relates to a modular header for a filtration module assembly including a main body having a first base surface extending in a first plane, an opposing second base surface extending in a second plane that is parallel to the first plane, and a longitudinal axis extending from the first base surface toward the second base surface; a first side surface extending in a third plane and an opposing second side surface extending in a fourth plane, the third and fourth planes being perpendicular to the first and second planes; a first liquid passageway and a second liquid passageway extending through the main body in a direction parallel to the first and second planes, the first liquid passageway having an inner diameter that is larger than an inner diameter of the second liquid passageway; a gas passageway extending through the main body in a direction parallel to the first and second planes, the inner diameter of the first and second liquid passageways being larger than an inner diameter of the gas passageway, the gas passageway having a first open end formed at the first side surface and an opposing second open end formed at the second side surface; and an auxiliary adapter secured to at least one of the first and second open ends of the gas passageway.

Another embodiment of the invention relates to a filtration module assembly including a plurality of filtration modules, each filtration module including a cylindrical shell having a first end and an opposing second end and a plurality of filtration membranes housed within the cylindrical shell; a first manifold assembly connected to the first ends of the plurality of filtration modules and a second manifold assembly connected to the second ends of the plurality of filtration modules, each of the first and second manifold assemblies comprising a plurality of interconnected modular headers, such that each modular header of the first manifold assembly is connected to the first end of a respective filtration module and each modular header of the second manifold assembly is connected to the second end of a respective filtration module; and a frame secured to the first manifold assembly. Each modular header includes a main body having a first base surface extending in a first plane, an opposing second base surface extending in a second plane that is parallel to the first plane, and a longitudinal axis extending from the first base surface toward the second base surface; a first side surface extending in a third plane and an opposing second side surface extending in a fourth plane, the third and fourth planes being perpendicular to the first and second planes; a first liquid passageway and a second liquid passageway extending through the main body in a direction parallel to the first and second planes, the first liquid passageway having an inner diameter that is larger than an inner diameter of the second liquid passageway; a gas passageway extending through the main body in a direction parallel to the first and second planes, the inner diameter of the first and second liquid passageways being larger than an inner diameter of the gas passageway, the gas passageway having a first open end formed at the first side surface and an opposing second open end formed at the second side surface; and an auxiliary adapter secured to at least one of the first and second open ends of the gas passageway.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

Figure 1:
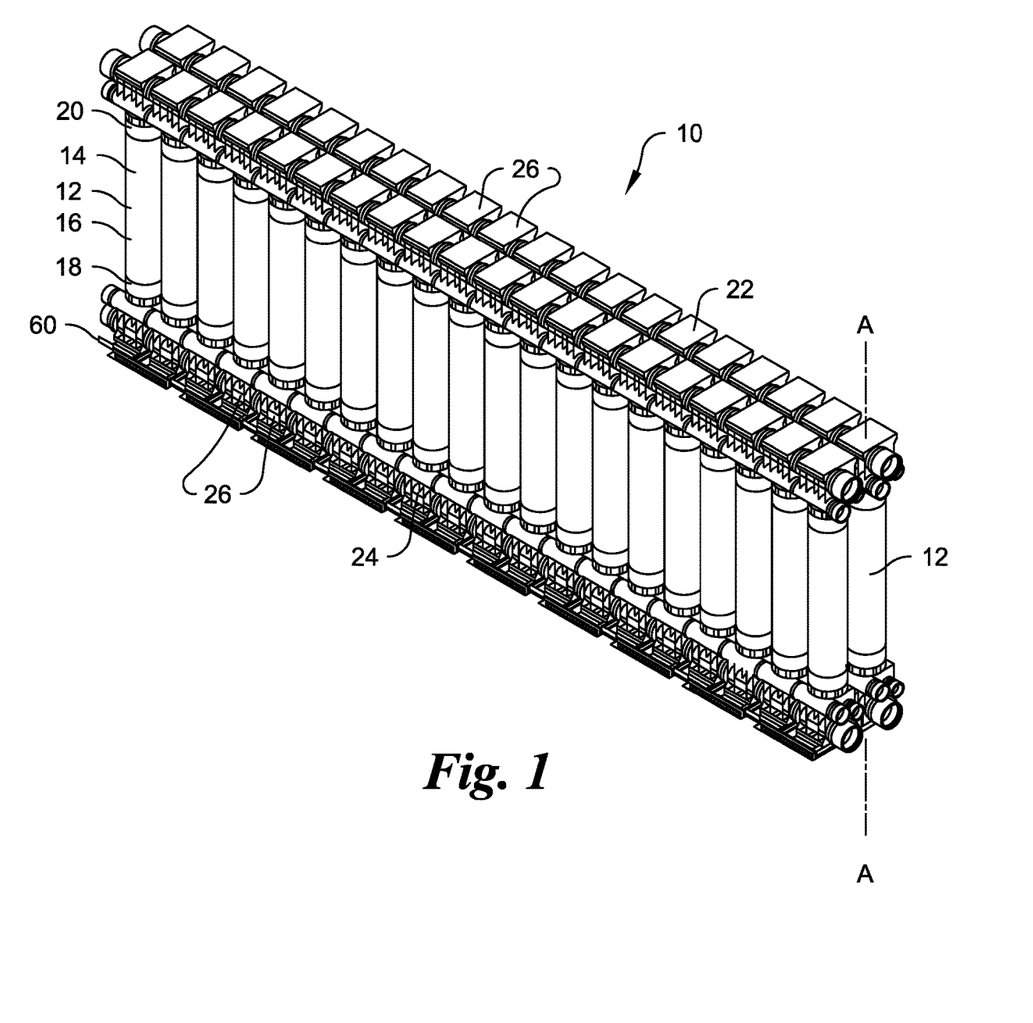
FIG. 1 is a side elevation view of a 2×20 liquid treatment system according to an embodiment of the present invention.
Figure 2:
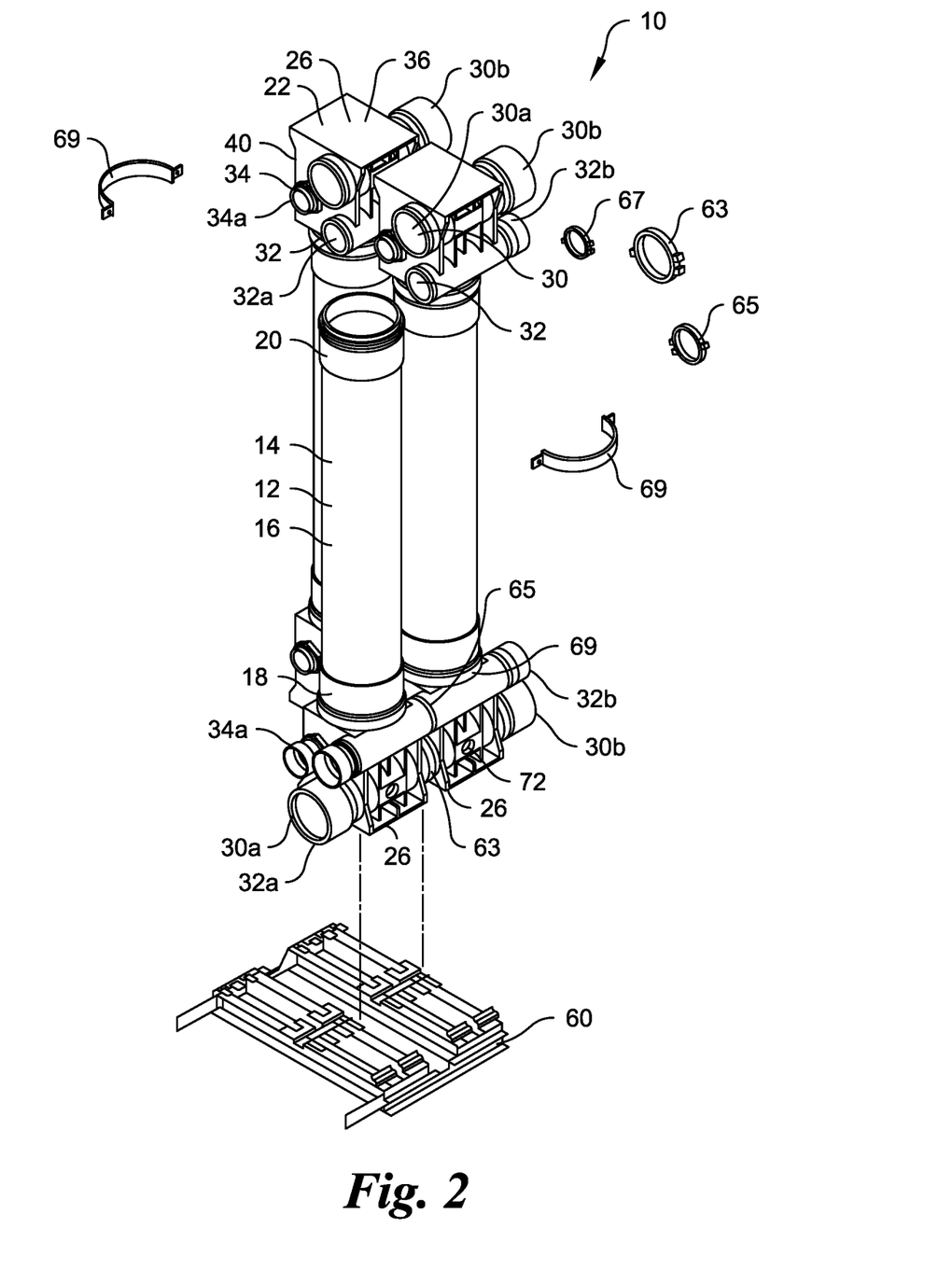
FIG. 2 is a side elevation partial view of a liquid treatment system according to an embodiment of the present invention, with certain components shown in an exploded view.
Figure 3:
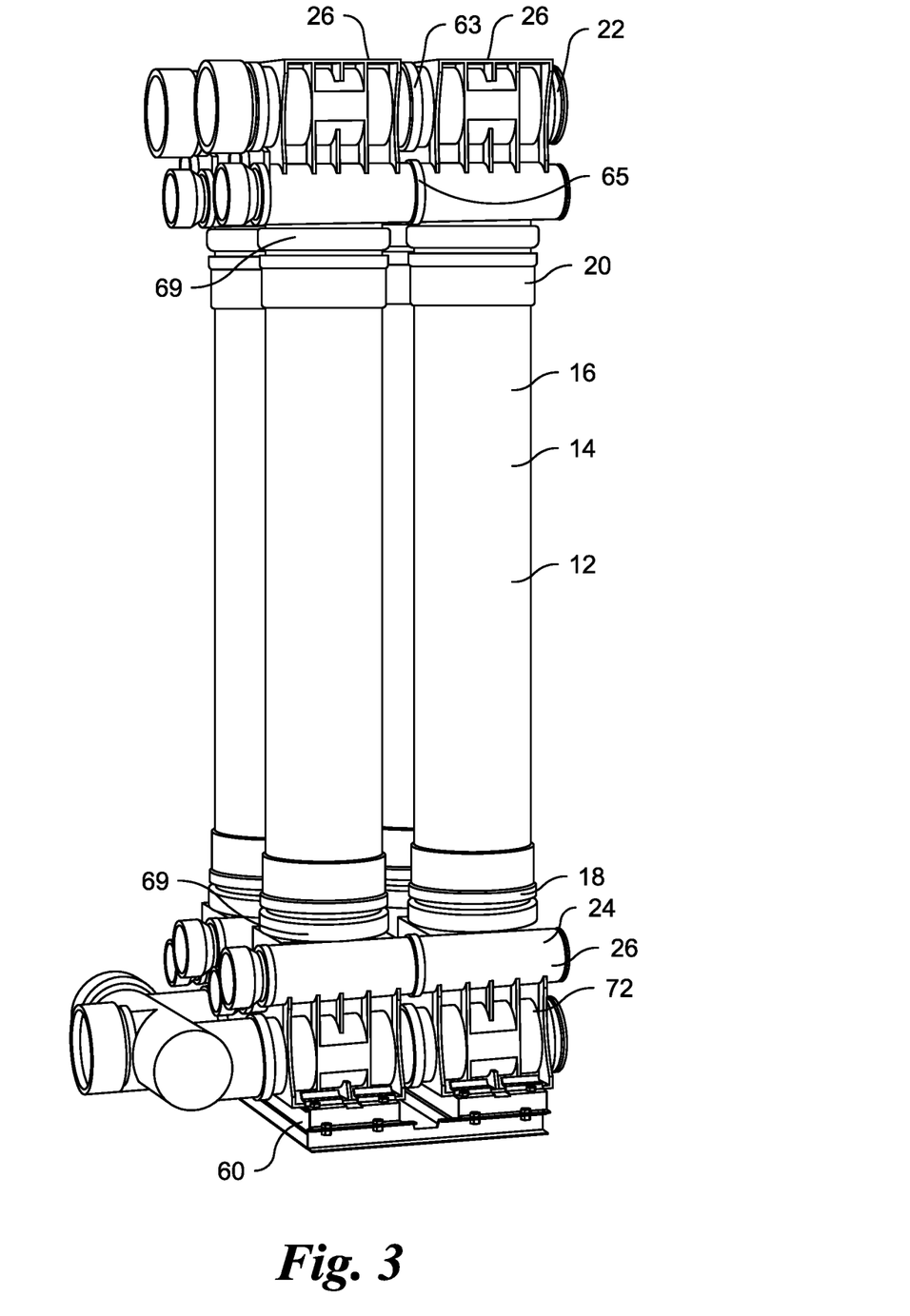
FIG. 3 is a side elevation view of a 2×2 liquid treatment system according to an embodiment of the present invention.

Referring to the drawings in detail, wherein like numerals indicate like elements throughout the several views, FIGS. 1-3 show a liquid treatment system, generally designated 10. The liquid treatment system 10 comprises one or more filtration modules 12, and more preferably an array of a plurality of filtration modules 12, arranged in any desired configuration and supported on a frame 60. The filtration modules 12 preferably form a filtration or other treatment apparatus for liquid, such as water. Piping, pumps, vessels, valves and/or other components (not shown) are preferably built around and/or operatively connected to the filtration modules 12 to form a complete liquid treatment system.

It will be understood by those skilled in the art that the filtration modules 12 may be any known form of a filtration module. In a preferred embodiment, each filtration module 12 includes an outer shell 16 having a first or lower end 18 and an opposing second or upper end 20. A longitudinal axis A of the outer shell 16 extends from the first end 18 to the second end 20. The outer shell 16 has a generally cylindrical outer peripheral sidewall 14. The outer shell 16 may be formed of, for example, a polymeric material, a metal (e.g., stainless steel), fiber reinforced plastic, and the like. However, each filtration module 12 is not limited to such a shape and/or material, as the filtration module 12 may be formed in any shape or from any material that allows for the functionality described herein. Each filtration module 12 preferably has a height, as measured along the longitudinal axis A, of several feet, but the module 12 may have any height that is desirable and allows for the functionality described herein. Each filtration module 12 may be a nano-filtration, microfiltration or ultrafiltration module, so as to filter relatively small particulate matter, such as colloidal matter.

Referring to FIGS. 1-3 and 14, the outer shell 16 of each filtration module 12 at least partially surrounds a plurality of filtration membranes 13 therein. In one embodiment, each filtration membrane 13 is generally tubular in shape and is preferably formed of a polymeric material. In one embodiment, each filtration membrane 13 is formed of a fibrous material, such that each filtration membrane 13 may be a hollow fiber. Each filtration membrane 13 preferably extends generally parallel to the longitudinal axis A. Opposing ends of each filtration membrane 13 are preferably fixed in place within the respective filtration module 12, for example by a potting section or adhesive (not shown) proximate at least one, and more preferably both, of the ends 18, 20 of the filtration module 12. Each filtration membrane 13 is preferably at least partially hollow such that at least some liquid can flow within each filtration membrane 13 either generally parallel or perpendicular to the longitudinal axis A. It will be understood by those skilled in the art that the structure and configuration of the filtration membranes 13 is not limited to a hollow fiber membrane 13, but rather the filtration membranes 13 may have any known structure and configuration as long as they are suitable for filtration of a liquid flowing through the filtration module 12.

The plurality of filtration modules 12 are connected to a common first or upper manifold assembly 22 and to a common second or lower manifold assembly 24. More particularly, the lower end 18 of each filtration module 12 is in fluid communication with a lower manifold assembly 24, and the upper end 20 of each filtration module 12 is in fluid communication with an upper manifold assembly 22. The upper manifold assembly 22 is comprised of a plurality of interconnected headers 26, and the lower manifold assembly 24 is comprised of a plurality of interconnected headers 26. The headers 26 of the upper and lower manifold assemblies 22, 24 are identical to each other.

Figure 4:
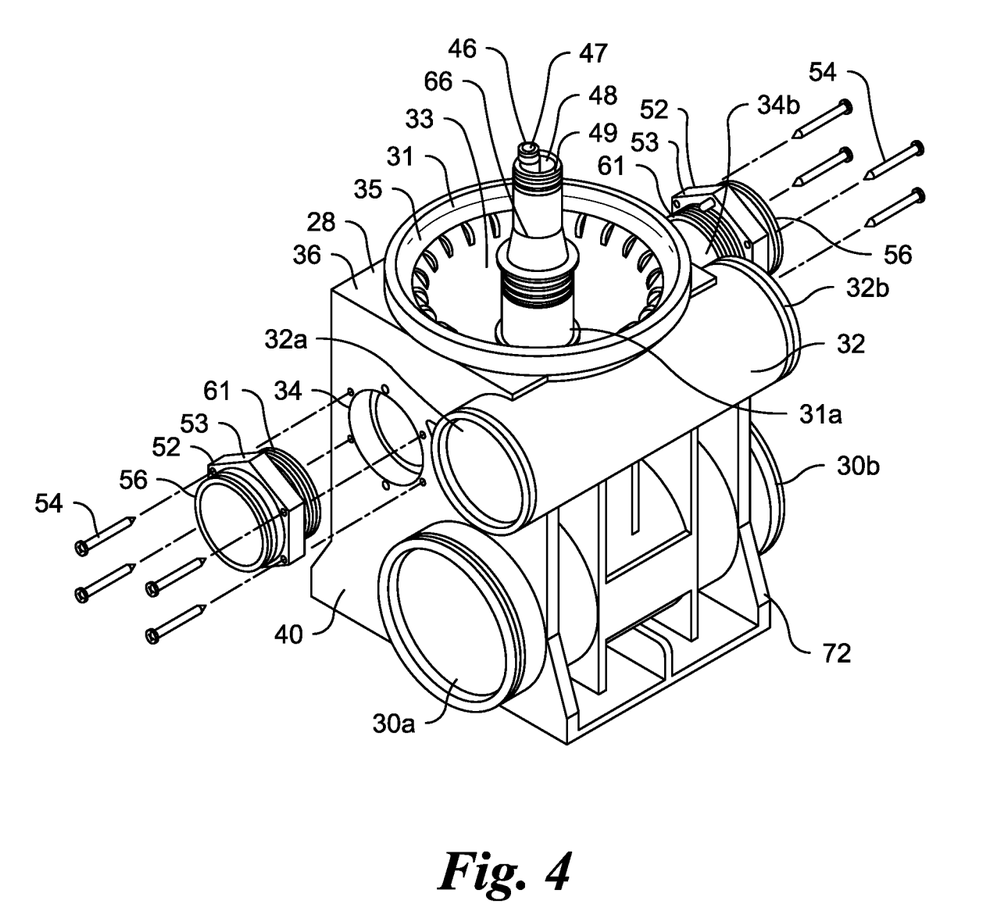
FIG. 4 is a side perspective view of a header of a manifold assembly of a liquid treatment system according to an embodiment of the present invention.

Referring to FIGS. 2 and 4, each header 26 comprises a main body 28 and at least three passageways 30, 32, 34 which extend through the main body 28 in a direction generally perpendicular to the longitudinal axis A. More particularly, the first, second and third passageways 30, 32, 34 are in the form of tubular conduits extending through the main body 28 in a direction generally perpendicular to the longitudinal axis A. The main body 28 of each header 26 is preferably formed of one or more rigid polymeric materials, such as polyvinyl chloride (PVC), acrylonitrile butadiene styrene (ABS) copolymer, polypropylene (PP) and polycarbonate (PC). Most preferably, the main body 28 is formed of PP or PVC. The polymeric material of the main body 28 may also include filler materials, and more preferably inorganic filler materials, such as silica, graphite and glass fiber.

The main body 28 has opposing first and second base surfaces 36, 38 which extend in planes that are parallel to each other; opposing first and second side surfaces 40, 42 which extend in planes that are parallel to each other and perpendicular to the first and second base surfaces 36, 38; and opposing third and fourth side surfaces 70, 72 which extend in planes that are parallel to each other and perpendicular to the first and second base surfaces 36, 38. A longitudinal axis of the main body 28 extends from the first base surface 36 toward the second base surface 38 parallel to the longitudinal axis A of the module 12. Each of the three passageways 30, 32, 34 has a first open end 30a, 32a, 34a at the first side surface 40 of the main body 28, and an opposing second open end 30b, 32b, 34b formed at the second side surface 42 of the main body 28. Adjacent headers 26 are connected to each other at each of the first, second and third passageways 30, 32, 34, so as to form contiguous first, second and third passageways 30, 32, 34 through the entirety of each of the upper and lower manifold assemblies 22, 24.

In one embodiment, the first open end 30a of the first passageway 30 is preferably configured as a female port and the second open end 30b is preferably configured as a male port, although it will be understood that the opposite configuration could be implemented in the alternative. The male port 30b preferably includes a protruding annular lip or rim 39 and the female port 30b preferably includes an annular groove or recess 41 sized and shaped to correspond to the annular lip 39. As such, when two or more headers 26 are connected, the annular lip 39 of a first header 26 is received within the corresponding annular recess 41 of the adjacent second header 26, the annular lip 39 of the second header 26 is received within the corresponding annular recess 41 of the adjacent third header 26, and so forth, such that the headers 26 are well aligned with each other and a contiguous first passageway 30 is formed through the entirety of the upper and lower manifold assemblies 22, 24. A clamp, gasket, O-ring, etc. may be provided at the interface of each connected female and male port 30a, 30b of the headers 26 so as to ensure a fluid tight seal at the interfaces. More particularly, at the interface of each connected annular lip 39 and annular recess 41, a peripheral groove is formed, and a gasket and a clamp 63 are received within the groove.

In one embodiment, the first open end 32a of the second passageway 32 is preferably also configured as a female port and the second open end 32b is preferably also configured as a male port, although it will be understood that the opposite configuration could be implemented in the alternative. The male port 32b preferably includes a protruding annular lip or rim 43 and the female port 32a preferably includes an annular groove or recess 45 sized and shaped to correspond to the annular lip 43. As such, when two or more headers 26 are connected, the annular lip 43 of a first header 26 is received within the corresponding annular recess 45 of the adjacent second header 26, the annular lip 43 of the second header 26 is received within the corresponding annular recess 45 of the adjacent third header 26, and so forth, such that the headers 26 are well aligned with each other and a contiguous second passageway 32 is formed through the entirety of the upper and lower manifold assemblies 22, 24. A clamp, gasket, O-ring, etc. may be provided at the interface of each connected female and male port 32a, 32b of the headers 26 so as to ensure a fluid tight seal at the interfaces. More particularly, at the interface of each connected annular lip 43 and annular recess 45, a peripheral groove is formed, and a gasket and a clamp 65 are received within the groove.

Figure 8:
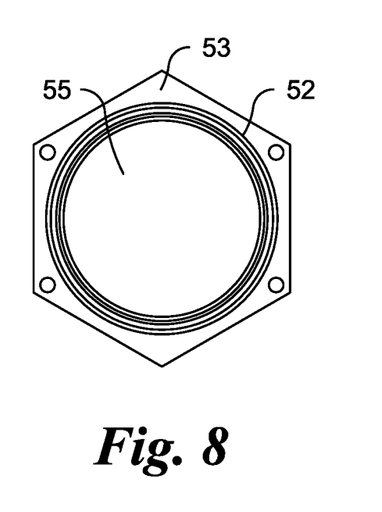
FIG. 8 is a front elevation view of an auxiliary adapter of the header shown in FIG. 4.
Figure 9:
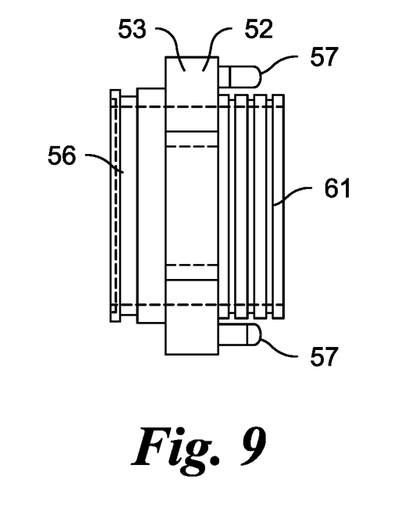
FIG. 9 is a side elevation view of the auxiliary adapter shown in FIG. 8.

In one embodiment, the first end 34a of the third passageway 34 and the second end 34b of the third passageway 34 each includes an auxiliary adapter 52 attached thereto. The adapter 52 has a main body 53 circumscribing a generally cylindrical opening 55 and an externally threaded conduit 61 extending from a first surface of the main body 53 and configured to be received within the first and second open ends 34a, 34b of the third passageway 34. The main body 53 is preferably of a hexagonal shape, but it will be understood that the main body could have any known shape, such as a circle, square, rectangle, and the like. The main body 53 of each adapter 52 is preferably formed of one or more rigid polymeric materials, such as PVC, ABS copolymer, PP and PC. Most preferably, the main body 53 of the adapter 52 is formed of PP or PVC. The polymeric material of the main body 53 of the adapter 52 may also include filler materials, and more preferably inorganic filler materials, such as silica, graphite and glass fiber.

A plurality of dowels 57 are also provided which extend from the first surface of the main body 53 and which are configured to be received within openings 59 formed in the main body 28 of each header 26. One or more screws 54 may be used to secure the adapter 52 to the main body 28 of each header 26. A generally tubular connector portion 56 extends from a second surface of the main body 53 of the adapter 52. The connector portion 56 of the adapter 52 of a first header 26 is configured to be secured to the connector portion 56 of the adapter 52 of an adjacent second header 26, and so forth, such that a contiguous third passageway 34 is formed through the entirety of the upper and lower manifold assemblies 22, 24. A clamp, gasket, O-ring, etc. may be provided at the interface of each connected adapter 52 of the headers 26 so as to ensure a fluid tight seal at the interfaces. More particularly, at the interface of connected adapters 52, a gasket and a clamp 67 are provided to ensure a tight seal, with the interface being designed to maintain the sealing component (e.g., gasket or clamp) in place to ensure correct functionality.

By providing the auxiliary adapter 52 at the open ends 34a, 34b of the gas passageway 34, which typically has the smallest diameter, the header 26 may be manufactured (e.g., injection molded) without the need for any computer numeric controlled (CNC) machining. That is, while CNC machining might have been required to achieve the desired geometry at the open ends 34a, 34b of the small diameter gas passageway 34, no such machining is required because the adapter 52 which provides the desired geometry is produced separately and secured to the header 26 (e.g., by threaded engagement and screws). The auxiliary adapters 52 also enable each header 26 to be truly modular.

The first passageway 30, the second passageway 32 and the third passageway 34 are preferably fluidically separated from each other. In other words, the first passageway 30, the second passageway 32 and the third passageway 34 are separate and distinct from each other. In one embodiment, the first passageway 30 is a fluid passageway through which a feed or retentate stream flows, the second passageway 32 is a fluid passageway through which a filtered or treated liquid (e.g., filtrate or permeate) flows, and the third passageway 34 is a fluid passageway through which a gas flows. As such, hereinafter, the first passageway 30 is sometimes referred to as the feed passageway, retentate passageway or feed/retentate passageway; the second passageway 32 is sometimes referred to as the filtrate passageway, permeate passageway or filtrate/permeate passageway; and the third passageway 34 is sometimes referred to as the gas passageway.

The inner diameter, of the first passageway 30 is preferably larger than the inner diameter of the second passageway 32, and the inner diameter of the second passageway 32 is preferably larger than the inner diameter of third passageway 34. In a preferred embodiment, the inner diameter of the feed/retentate passageway 30 is 6 inches, the inner diameter of the filtrate/permeate passageway 32 is 4 inches and the inner diameter of the gas passageway 34 is 3 inches. However, it will be understood by those skilled in the art that the diameters of the feed/retentate passageway 30, the filtrate/permeate passageway 32 and the gas passageway 34 may be adjusted and selected as necessary or desired to suit an end application.

Figure 5:
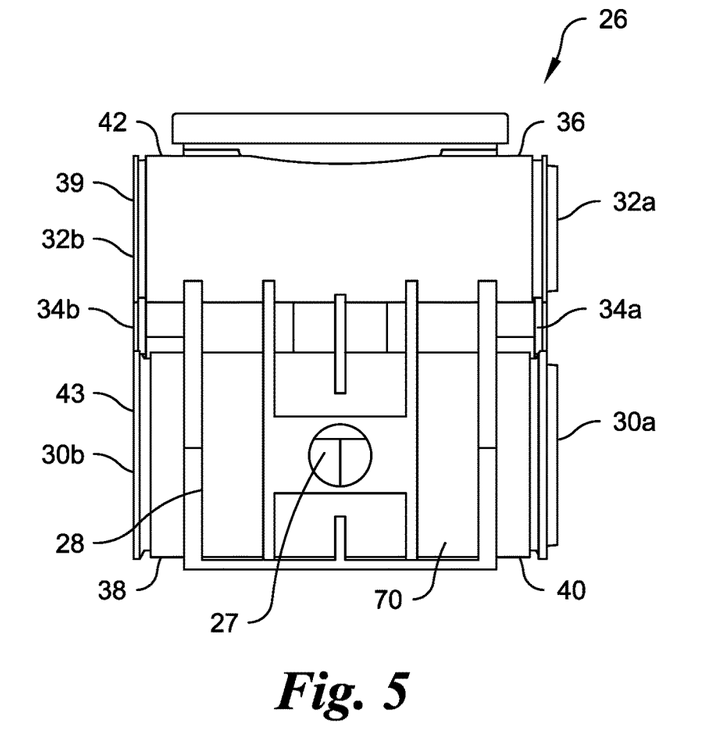
FIG. 5 is a rear elevation view of the header shown in FIG. 4.
Figure 6:
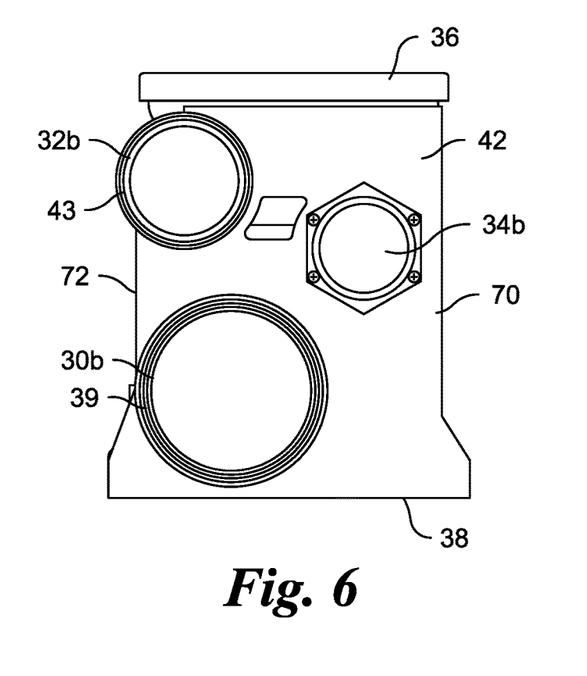
FIG. 6 is a right elevation view of the header shown in FIG. 4.
Figure 7:
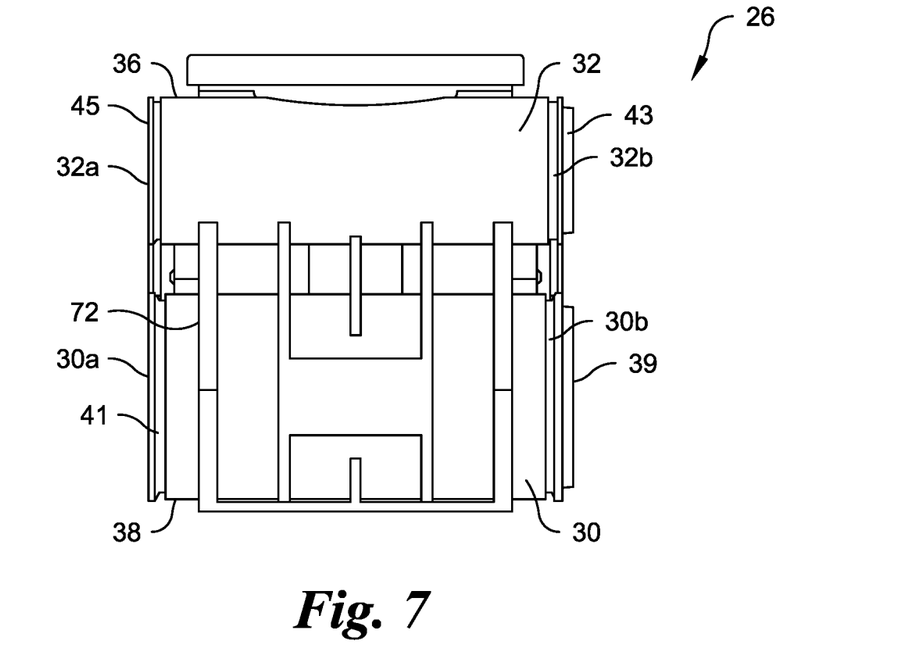
FIG. 7 is a front elevation view of the header shown in FIG. 4.

Referring to FIG. 5, in one embodiment, at least a portion 27 of the main body 28 of each header 26 is equipped with a transparent material to enable viewing of the flow through the header 26. More particularly, a portion 27 of the body 28 of the header 26 which corresponds to the first passageway 30 (i.e., the feed/retentate passageway 30) is provided with a transparent material, such as a transparent resin (e.g., PC) or glass material, hereinafter referred to as sight glass, for bubble observation, because bubbles are a typical sign of development in the event of a membrane's failure due to exposure to mechanical and/or chemical stresses. In one embodiment, the sight glass 27 is in the shape of a keystone. However, it will be understood that the sight glass 27 could have any shape, size, dimensions, etc. A gasket (not shown) may be provided around the periphery of the sight glass 27 to ensure a tight and secure engagement with the main body 28 of the header 26.

Figure 10:
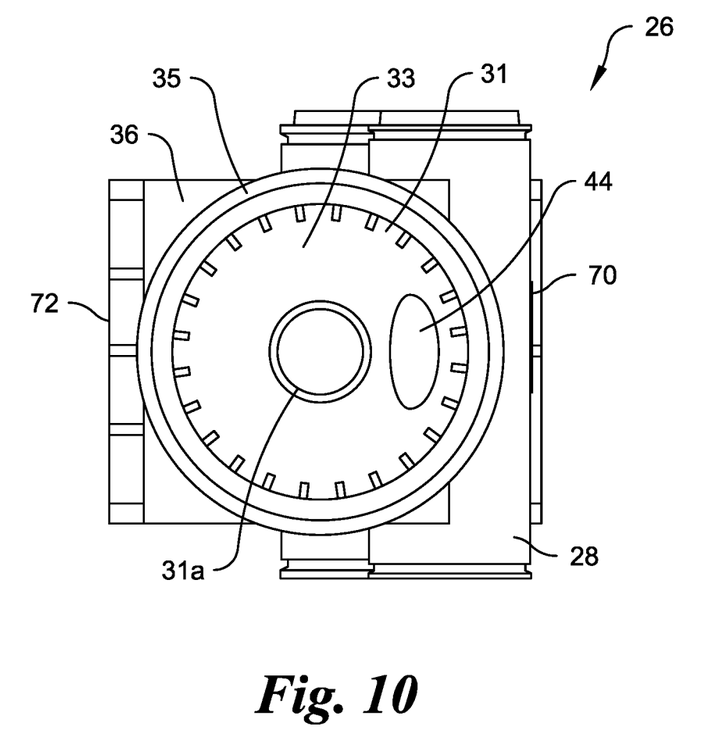
FIG. 10 is a top plan view of the header shown in FIG. 4.

Referring to FIGS. 4 and 10, the first base surface 36 of the main body 28 of each header 26 preferably includes a connection member or socket 31 configured to couple the header 26 to a respective filtration module 12. The connection member 31 preferably has a generally concave body 33 surrounded by a peripheral rim 35. The connection member 31 may be integrally and unitarily formed with the main body 28 or may be removably attached thereto. The connection member 31 of each header 26 of the lower manifold assembly 24 is connected to the lower end 18 of a respective filtration module 12 (e.g., at the peripheral rim 35) such that the lower manifold assembly 24 and the filtration modules 12 are in fluid communication with each other, and the connection member 31 of each header 26 of the upper manifold assembly 22 is connected to the upper end 20 of a respective filtration module 12 (e.g., at the peripheral rim 35) such that the upper manifold assembly 22 and the filtration modules 12 are in fluid communication with each other. A clamp 69, gasket, O-ring, etc. may be provided at the interface of each connection member 31 and filtration module 12 so as to ensure a fluid tight seal.

The connection member 31 preferably includes a liquid exit port 44, for example formed in the concave body 33, and more particularly formed in a base of the concave body 33 at a position offset from a geometric center of the concave body 33. The liquid exit port 44 is in fluid communication with the filtrate/permeate passageway 32 (see FIG. 10). Filtered or otherwise treated liquid, hereinafter referred to as filtrate/permeate, exits each filtration module 12 through the lower and/or upper ends 18, 20 after the liquid has passed through or otherwise circulated within the module 12, and then passes into the filtrate/permeate passageways 32 of the respective headers 26 of the upper and lower manifold assemblies 22, 24 via the respective liquid exit port 44. The size, shape and/or configuration of the liquid exit port 44 is not limited in any particular manner.

Referring to FIG. 4, an adapter 66 is preferably inserted through a central opening 31a of the connection member 31 of each header 26. The adapter 66 is preferably formed of one or more rigid polymeric materials, such as PVC, ABS copolymer, PP and PC. Most preferably, the adapter 66 is formed of PP, PVC or ABS copolymer. The polymeric material of the adapter 66 may also include filler materials, and more preferably inorganic filler materials, such as silica, graphite and glass fiber.

The adapter 66 has a generally cylindrical body, with one end attached to and/or in communication with the connection member 31 and the opposing end attached to and/or in communication with the respective filtration module 12. The adapter 66 preferably includes two fluid passageways 46, 48 which are fluidically separated from each other. In one embodiment, the first passageway 46 is delimited by a first tubular conduit 47 and the second passageway 48 is delimited by a second tubular conduit 49 which surrounds the first tubular conduit 47. The first passageway 46 is preferably a gas passageway that is in communication with the filtration membrane 13 of each filtration module 12 and the gas passageway 34 of each header 26. The second passageway 48 is preferably a liquid passageway that is in communication with the filtration membrane 13 of each filtration module 12 and the feed/retentate passageway 30 of each header 26.

The first passageway 30 of each of the upper and lower manifold assemblies 22, 24 is preferably in communication with a feed liquid vessel or source (not shown) and/or a retentate storage vessel (not shown). For example, in one embodiment, the exposed port 30a or 30b of the first or upstream header 26 of the first passageway 30 of the lower manifold assembly 24 is preferably in communication with a feed liquid vessel or source, the exposed port 30a or 30b of the last or downstream header 26 of the first passageway 30 of the lower manifold assembly 24 is closed off by a plug, the exposed port 30a or 30b of the first header 26 of the first passageway 30 of the upper manifold assembly 22 is in communication with a retentate storage vessel, and the exposed port 30a or 30b of the last header 26 of the first passageway 30 of the upper manifold assembly 22 is closed off by a plug. It will be understood that the reverse configuration may be implemented, depending on the desired filtration configuration.

The second passageway 32 of each of the upper and lower manifold assemblies 22, 24 is preferably in communication with a filtrate/permeate storage vessel (not shown). More particularly, at least one of the exposed ports 32a or 32b of the first and/or last header 26 of the upper manifold assembly 22 or lower manifold assembly 24 is connected to a filtrate/permeate storage vessel, while the other exposed ports 32a, 32b are closed off by a plug. The third passageway 34 of the lower manifold assembly 24 is preferably in communication with a gas (e.g., air) source. More particularly, at least one of the exposed ports 34a or 34b of the first and/or last header 26 of the lower manifold assembly 24 is connected to a gas source, while the other exposed ports 34a, 34b are closed off by a plug.

The liquid treatment system 10 preferably has and/or is operable in a first configuration which is for treating a feed liquid and a second configuration which is for cleaning of the filtration membranes 13 of the filtration modules 10. In the first and second configurations, liquid and gas are preferably injected into the upper and/or lower manifold assemblies 22, 24 and are permitted to exit the upper and/or lower manifold assemblies 22, 24 by operation of one or more valves.

Figure 11:
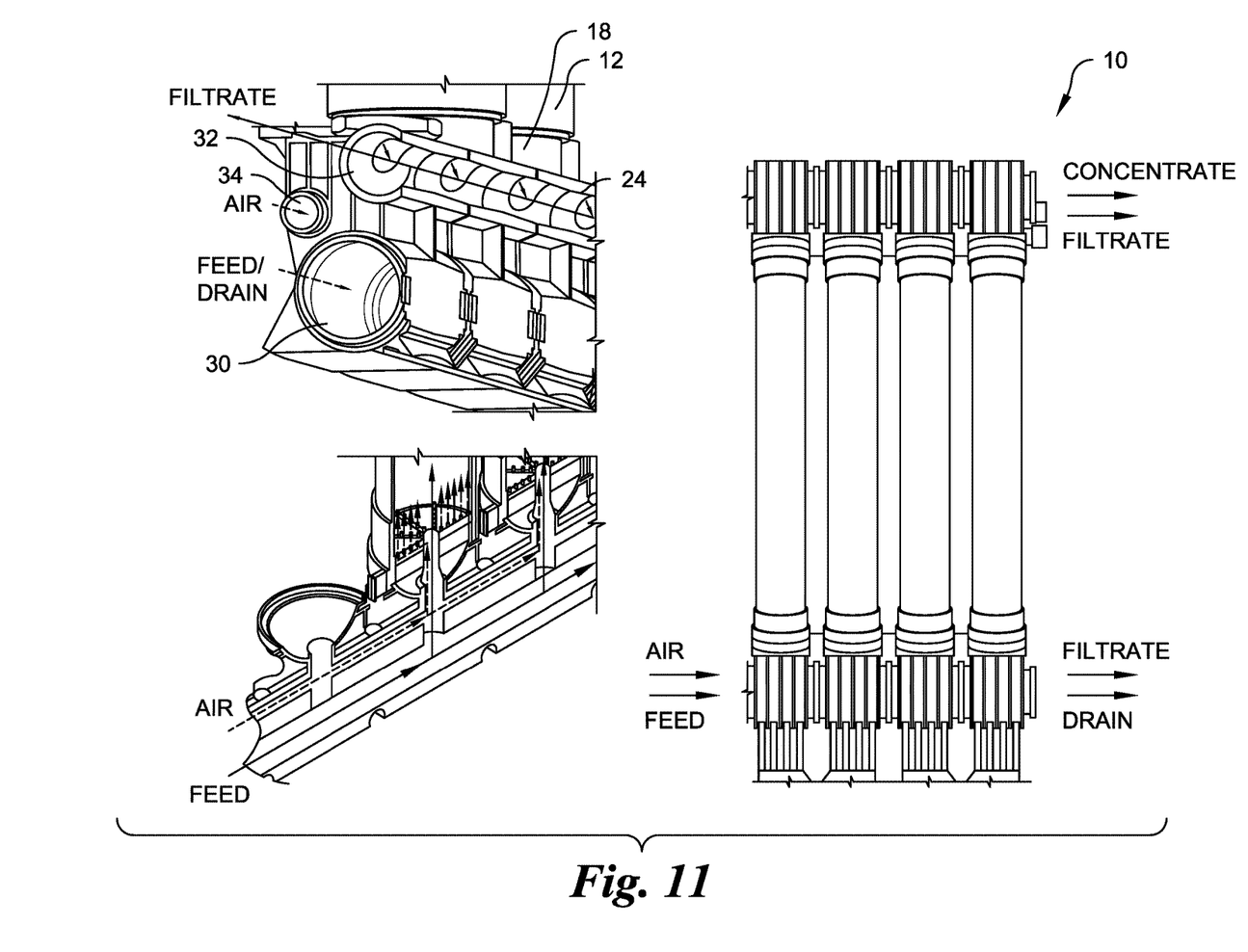
FIG. 11 provides different views of the liquid treatment system of FIG. 1 showing the flow of liquid and gas through the system.

In operation in the first configuration (i.e., the treatment configuration), feed liquid to be treated is introduced into the feed passageway 30 of the upper manifold assembly 22 and/or the lower manifold assembly 24, preferably by opening a feed valve (not shown) connected to or associated with the feed passageway 30 of each of the upper and/or lower manifold assemblies 22, 24. In each header 26 of the upper or lower manifold assemblies 22, 24, the feed liquid flows through the feed passageway 30 of the header 26 toward the adapter 66, to the second passageway 48 of each adapter 66, and then flows through the second passageway 48 of each adapter 66 into the respective filtration module 12 to be filtered by the respective filtration membrane 13. In the treatment configuration, a gas valve (not shown), a drain valve (not shown) and a gas vent valve (not shown) are all preferably at least initially closed. However, a filtrate/permeate valve (not shown), which is operatively connected to the filtrate/permeate passageway 32 of the upper manifold assembly 22 and/or lower manifold assembly 24 is preferably at least initially opened. The feed liquid to be filtered penetrates the filtration membranes 13 of the plurality of filtration modules 12, and the filtrate/permeate flows upwardly and/or downwardly therein. Because two liquid exit ports 44 are provided (i.e., at the headers 26 of the upper manifold assembly 22 and also at the headers 26 of the lower manifold assembly 24), filtrate or permeate can exit the filtration modules 12 at both the upper and lower ends 20, 18 thereof, flow into the filtrate/permeate passageway 32 of the upper manifold assembly 22 and/or lower manifold assembly 24, and ultimately out of the system 10, as shown in FIG. 11, for collection. Introduction of the feed liquid and removal of the filtrate/permeate can be conducted in series or in parallel.

During operation in the treatment configuration, particulate matter tends to accumulate on and/or within the filtration membranes 13 and the interiors of the filtration modules 12. To continue to effectively and efficiently filter liquid, the particulate matter should be removed from the filtration membranes 13 and the interiors of the filtration modules 12. To do so, the introduction of liquid into the feed passageway 30 of the upper and/or lower manifold assemblies 22, 24 is preferably at least temporarily stopped, for example, by closing the feed valve. In addition, filtrate/permeate is also preferably at least temporarily stopped from exiting the upper and/or lower manifold assemblies 22, 24, which can be accomplished by simply allowing all of the filtrate/permeate to drain from the filtration modules 10 through the liquid exit ports 44 and the filtrate/permeate passageway 32, or by closing the filtrate/permeate valve.

Figure 11A:
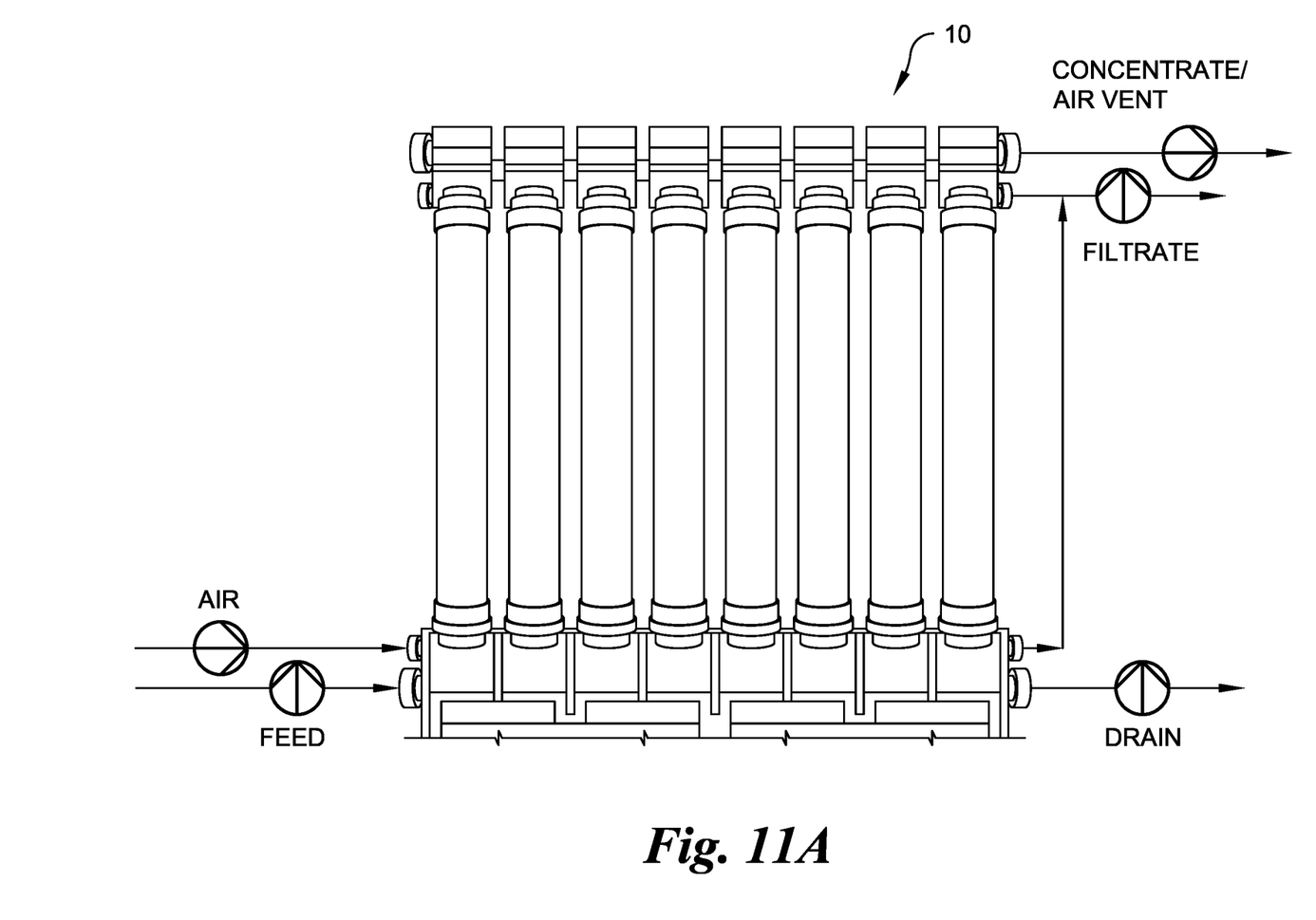
FIG. 11A provides different views of the liquid treatment system of FIG. 1 showing the venting of gas through the system.
Figure 12:
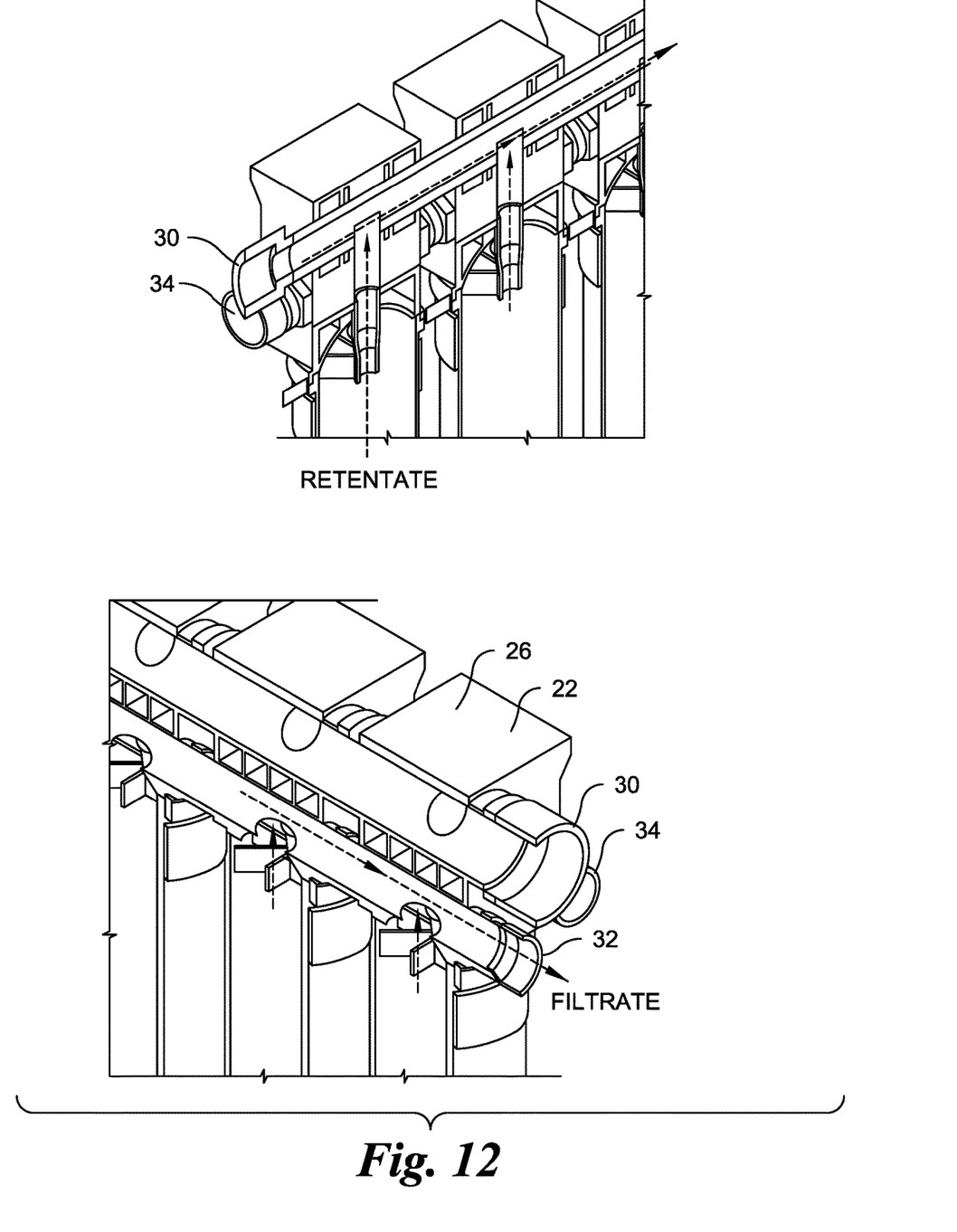
FIG. 12 provides cross-sectional views of the upper manifold assembly of the liquid treatment system of FIG. 1 showing the flow of liquid through the system.

Next, the system 10 is operated in the second configuration (i.e., the cleaning configuration). In the cleaning configuration, gas, such as air, is preferably injected into the gas passageway 34 of the headers 26 of the lower manifold assembly 24. This can be accomplished by opening the gas valve, such that gas preferably travels through the gas passageway 34 of the headers 26 of the lower manifold assembly 24, into the first passageway 46 of each adapter 40, and then into each of the filtration modules 12 to contact the filtration membranes 13 within the modules 12 to scour the filtration membranes 13. Gas is also preferably at least temporarily permitted to exit the filtration modules 12 via the feed/retentate passageway 30 by opening the gas vent valve, as shown in FIG. 11A. The gas essentially helps to clean the filtration membranes 13 and the interiors of the filtration modules 12 by loosening the particulate matter from their surfaces.

Gas is then preferably at least temporarily prevented from exiting the filtration modules 12 which can be done, for example, by closing the gas vent valve. Next, at least some particulate matter scoured from the filtration membranes 13 as a result of the injection of gas into the modules 12 is preferably at least temporarily permitted to drain from or otherwise exit the modules 12, for example, by opening the drain valve. The scouring and draining steps are preferably carried out in parallel. Meanwhile, gas is preferably continuously injected into the filtration module 12, as described above, which promotes draining of the particulate matter. The draining of the particulate matter is then preferably at least temporarily stopped. This can be accomplished by simply allowing all of the particulate matter to drain from the filtration module 12 or by closing the drain valve. Gas in the filtration modules 12 is preferably permitted to exit the modules 12 which can be done, for example, by opening the gas vent valve.

Figure 13:
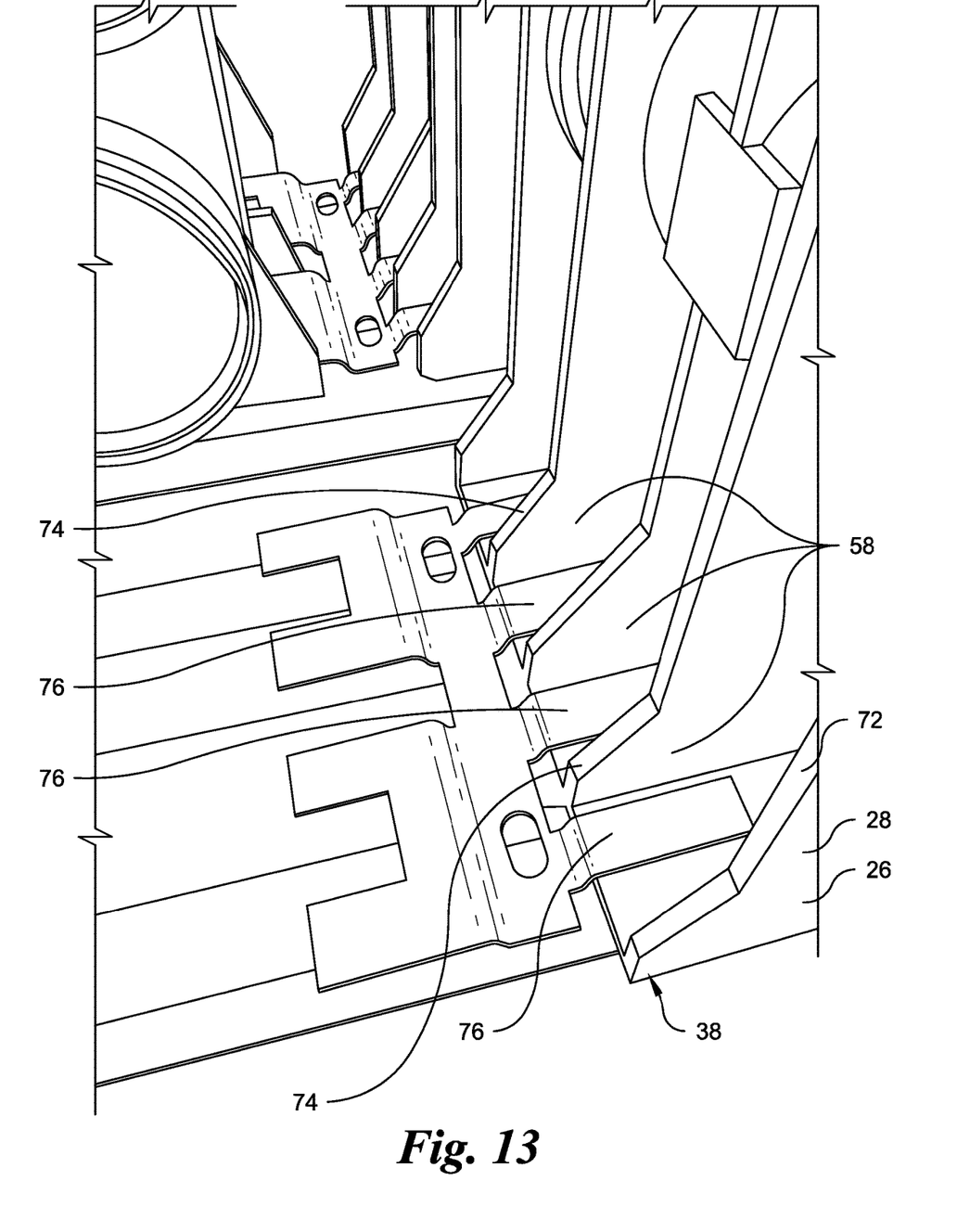
FIG. 13 is an enlarged top perspective view of the connection of the lower manifold assembly and the frame of the liquid treatment system according to an embodiment of the present invention.
Figure 14:
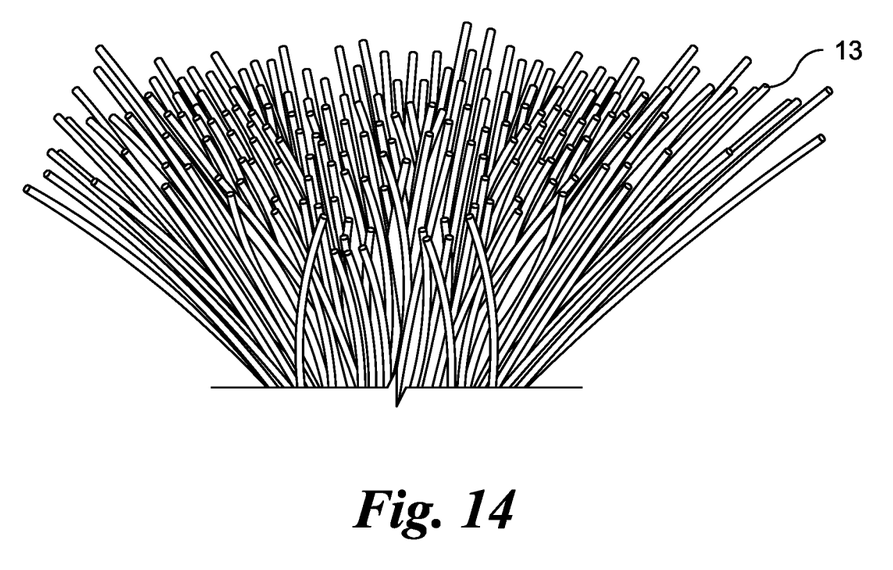
FIG. 14 is an enlarged view of a plurality of the filtration membranes housed within the outer shell of each filtration module in a liquid treatment system according to embodiments of the present invention.

In a preferred embodiment, the lower manifold assembly 24 is secured to a frame 60 which provides stability to the overall treatment system 10. More particularly, each header 26 is detachably or permanently secured to the frame 60. The frame 60 is made of a metal material, preferably stainless steel. In one embodiment, referring to FIG. 13, the second base surface 38 of the main body 28 of each header 26 includes at least one pocket, slot or recess 58, and preferably a plurality of pockets, slots or recesses 58. More particularly, the pockets 58 are formed between the second base surface 38 and the fourth side surface 72. Upstanding walls 74 extend upwardly from the second base surface 38 to form the distinct pockets 58. The frame 60 includes a plurality of tongues or beams 76, and more particularly cantilevered tongues or beams 76, in positions corresponding to the pockets 58 of each header 26. To assemble the lower manifold assembly 24 with the frame 60, the cantilevered tongues 76 of the frame 60 are positioned or inserted within respective pockets 58 of each header 26 in a secure fit. In one embodiment, the tongues 76 may be bolted, nailed, welded, adhered, snap-fit, etc. to the respective pockets 58 of each header 26.

Since all liquid and gas passageways are formed in each modular header, a modular manifold assembly is provided. For example, in the event of the failure of one header and/or filtration module 12, the failed header and/or filtration module 12 may be easily disconnected and separated from the manifold assembly, while the modular headers which remain in place continue to function and operate as needed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A modular header for a filtration module assembly, the modular header comprising:
   a main body;
   a first liquid passageway and a second liquid passageway each extending through the main body;
   a gas passageway extending through the main body, the gas passageway having a first open end formed at a first side surface of the main body and an opposing second open end formed at a second side surface of the main body; and
   an adapter secured to the main body at at least one of the first and second open ends of the gas passageway, the adapter comprising an adapter main body circumscribing a generally cylindrical opening, a first conduit extending from a first surface of the adapter main body and configured to be received within the at least one of the first and second open ends of the gas passageway, and a second conduit extending from a second surface of the adapter main body, the second conduit being a connector portion configured to connect to an adjacent modular header.

2. The modular header according to claim 1, wherein the first liquid passageway, the second liquid passageway, and the gas passageway extend parallel to each other.

3. The modular header according to claim 1, wherein the first liquid passageway has an inner diameter that is larger than an inner diameter of the second liquid passageway.

4. The modular header according to claim 3, wherein the inner diameters of the first and second liquid passageways are larger than an inner diameter of the gas passageway.

5. The modular header according to claim 1, wherein at least a portion of the main body comprises a transparent resin or a transparent glass material to enable viewing of flow through at least one of the passageways of the modular header.

6. The modular header according to claim 1, wherein the adapter further comprises a plurality of dowels extending from the first surface of the adapter main body and configured to be received within corresponding openings formed in the main body of a respective modular header.

7. The modular header according to claim 1, further comprising one or more screws securing the adapter to the main body.

8. A modular header for a filtration module assembly, the modular header comprising:
a main body having a first base surface extending in a first plane, an opposing second base surface extending in a second plane that is parallel to the first plane, and a longitudinal axis extending from the first base surface toward the second base surface;
a first side surface extending in a third plane and an opposing second side surface extending in a fourth plane, the third and fourth planes being perpendicular to the first and second planes;
a first liquid passageway and a second liquid passageway each extending through the main body in a direction parallel to the first and second planes, the first liquid passageway having an inner diameter that is larger than an inner diameter of the second liquid passageway;
a gas passageway extending through the main body in a direction parallel to the first and second planes, the inner diameter of the first and second liquid passageways being larger than an inner diameter of the gas passageway, the gas passageway having a first open end formed at the first side surface and an opposing second open end formed at the second side surface; and
adapter secured to at least one of the first and second open ends of the gas passageway, the adapter comprising an adapter main body circumscribing a generally cylindrical opening, a first conduit extending from a first surface of the adapter main body and configured to be received within the at least one of the first and second open ends of the gas passageway, and a second conduit extending from a second surface of the adapter main body, the second conduit being a connector portion configured to connect to an adjacent modular header.

9. The modular header according to claim 8, wherein at least a portion of the main body comprises a transparent resin or a transparent glass material to enable viewing of the flow through at least one of the passageways of the modular header.

10. The modular header according to claim 8, wherein the adapter further comprises a plurality of dowels extending from the first surface of the adapter main body and configured to be received within corresponding openings formed in the main body of a respective modular header.

11. The modular header according to claim 8, further comprising one or more screws securing the adapter to the main body.

12. A filtration module assembly comprising:
a plurality of filtration modules, each filtration module including a cylindrical shell having a first end and an opposing second end and a plurality of filtration membranes housed within the cylindrical shell;
a first manifold assembly connected to the first ends of the plurality of filtration modules and a second manifold assembly connected to the second ends of the plurality of filtration modules, each of the first and second manifold assemblies comprising a plurality of interconnected modular headers, such that each modular header of the first manifold assembly is connected to the first end of a respective filtration module and each modular header of the second manifold assembly is connected to the second end of a respective filtration module; and
a frame secured to the first manifold assembly,
wherein each modular header comprises:
a main body having a first base surface extending in a first plane, an opposing second base surface extending in a second plane that is parallel to the first plane, and a longitudinal axis extending from the first base surface toward the second base surface;
a first side surface extending in a third plane and an opposing second side surface extending in a fourth plane, the third and fourth planes being perpendicular to the first and second planes;
a first liquid passageway and a second liquid passageway each extending through the main body in a direction parallel to the first and second planes, the first liquid passageway having an inner diameter that is larger than an inner diameter of the second liquid passageway;
a gas passageway extending through the main body in a direction parallel to the first and second planes, the inner diameter of the first and second liquid passageways being larger than an inner diameter of the gas passageway, the gas passageway having a first open end formed at the first side surface and an opposing second open end formed at the second side surface; and
an adapter secured to at least one of the first and second open ends of the gas passageway.

13. The modular header according to claim 12, wherein at least a portion of the main body comprises a transparent resin or a transparent glass material to enable viewing of flow through at least one of the passageways of the modular header.

14. The modular header according to claim 12, wherein the adapter comprises an adapter main body circumscribing a generally cylindrical opening, a first conduit extending from a first surface of the adapter main body and configured to be received within the at least one of the first and second open ends of the gas passageway, and a second conduit extending from a second surface of the adapter main body, the second conduit being a connector portion configured to connect to an adjacent modular header.

15. The modular header according to claim 14, wherein the adapter further comprises a plurality of dowels extending from the first surface of the adapter main body and configured to be received within corresponding openings formed in the main body of a respective modular header.

16. The modular header according to claim 14, further comprising one or more screws securing the adapter to the main body.

* * * * *